United States Patent [19]

Rikimaru et al.

[11] Patent Number: 4,952,381

[45] Date of Patent: Aug. 28, 1990

[54] METHOD FOR DENITRIZING NITROGEN OXIDES CONTAINED IN WASTE GAS

[75] Inventors: Horiaki Rikimaru; Tadao Nakatsuji; Toshikatsu Umaba; Kazuhiko Nagano; Kazuya Mishina; Hiromitsu Shimizu, all of Osaka; Shigeru Nojima, Hiroshima; Kozo Iida, Hiroshima; Yoshiaki Obayashi, Hiroshima; Touru Seto, Hiroshima; Shigeaki Mitsuoka, Hiroshima; Masayuki Hanada, Fukuoka; Morio Fukuda, Fukuoka; Kiyoshi Nagano, Fukuoka; Makoto Imanari, Ibaraki; Takeo Koshikawa, Ibaraki; Akihiro Yamauchi, Tokyo, all of Japan

[73] Assignees: Sakai Chemical Industry Co., Ltd., Osaka; Mitsubishi Jukogyo Kabushiki Kaisha, Tokyo; Mitsubishi Petrochemical Co., Ltd., Tokyo; Mitsubishi Petrochemical Engineering Co., Ltd., Tokyo; Catalysts & Chemicals Industries Co., Ltd., Tokyo, all of Japan

[21] Appl. No.: 284,764

[22] Filed: Dec. 12, 1988

Related U.S. Application Data

[62] Division of Ser. No. 77,868, Jul. 27, 1987, abandoned.

[30] Foreign Application Priority Data

Jul. 25, 1986 [JP] Japan .................. 61-173813
Jul. 31, 1986 [JP] Japan .................. 61-178725
Sep. 13, 1986 [JP] Japan .................. 61-216356
Sep. 13, 1986 [JP] Japan .................. 61-216357

[51] Int. Cl.$^5$ .......................... B01J 8/00; C01B 17/00
[52] U.S. Cl. .................................................. 423/239
[58] Field of Search .......................... 423/239 A, 239; 502/309, 324, 350

[56] References Cited

U.S. PATENT DOCUMENTS

| | | | |
|---|---|---|---|
| 3,676,332 | 7/1972 | Johnson et al. | 502/309 X |
| 3,770,660 | 11/1973 | Tabler | 502/350 X |
| 4,111,793 | 9/1978 | Kolombos et al. | 502/324 X |
| 4,140,654 | 2/1979 | Yoshioka et al. | 423/239 A |
| 4,378,338 | 3/1983 | Imanari et al. | 423/239 |

FOREIGN PATENT DOCUMENTS

| | | | |
|---|---|---|---|
| 51-66277 | 6/1976 | Japan | 423/239 A |
| 54-11093 | 1/1979 | Japan | 502/324 |

*Primary Examiner*—Gregory A. Heller
*Attorney, Agent, or Firm*—Wenderoth, Lind & Ponack

[57] ABSTRACT

A catalyst for denitrizing nitrogen oxides contained in waste gas which contains a substantial amount of arsenic compounds therein, which comprises:

(a) titanium, and
(b) at least one element selected from the group consisting of arsenic and manganese. The catalyst is resistant to deactivation by arsenic compounds and retains high denitrizing activity over a long period of time. The catalyst may further contain at least one base metal selected from the group consisting of V, W, Mo, Cu, Fe, Cr, Co, Ni, Zn and Sn.

7 Claims, 1 Drawing Sheet

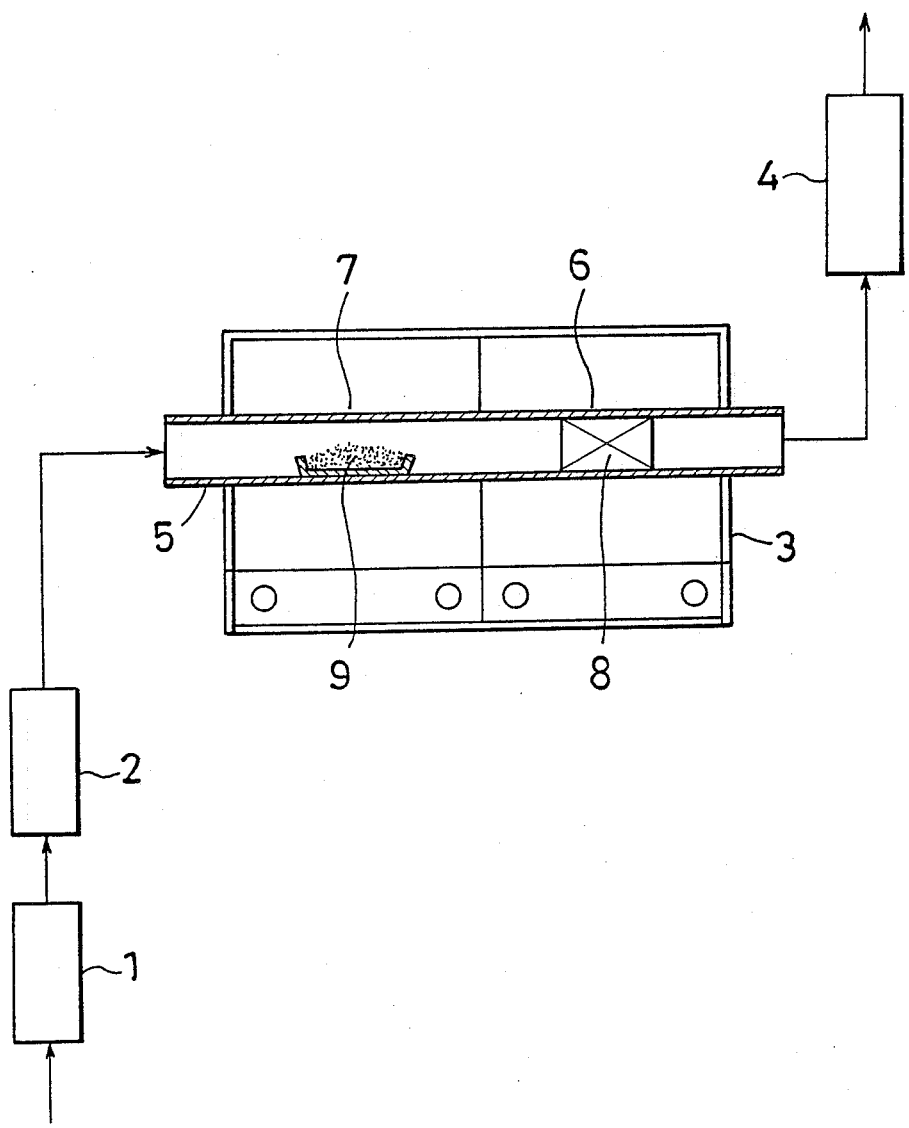

METHOD FOR DENITRIZING NITROGEN OXIDES CONTAINED IN WASTE GAS

This application is a division of now abandoned application Ser. No. 07/077,868, filed July 27, 1987, now abandoned.

This invention relates to a catalyst and a method for denitrizing nitrogen oxides contained in waste gas, and more particularly, to a catalyst for denitrizing nitrogen oxides which is resistant to deactivation or poisoning by arsenic compounds such as diarsenic trioxide contained in waste gas together with nitrogen oxides, and a method of denitrizing such waste has by use of such catalysts.

Denitrizing processes have been recently developed and in part practically carried out in industry to convert noxious nitrogen oxides into innoxious compounds or to remove them from the waste gas. In a representative denitrizing process, combustion waste gas from coal-fueled boilers which contains nitrogen oxides therein is admixed with a reducing gas, and the resultant gas mixture is put into contact with a denitrizing catalyst, thereby to reduce the nitrogen oxides into innoxious compounds. A variety of processes are already known, but a selective catalytic reduction process in which ammonia is used as the reducing gas is said most advantageous from the standpoint of controllability of catalytic reduction reactions of nitrogen oxides and process economy.

Heretofore, the process has been applied only to waste gas which contains no arsenic compounds therein or contains arsenic compounds in such trace amounts as give substantially no influence upon the catalytic activity of denitrizing catalysts. However, a substantial amount of arsenic compounds is occasionally contained in combustion waste gas from coal-fueled boilers depending upon the coal used as a fuel, and it has been noted very recently that denitrizing catalysts are deactivated or poisoned within a short period of time by arsenic compounds when the catalysts are put into contact with such arsenic compounds.

It is, therefore, an object of the invention to provide an economical denitrizing catalyst which retains over a long period of time a high catalytic activity in the denitrization of waste gas containing a substantial amount of arsenic compounds therein.

It is also an object of the invention to provide a method of denitrizing waste gas which contains a substantial amount of arsenic compounds therein with no substantial decrease in catalytic activity of denitrizing catalysts.

There is provided according to the invention a catalyst for denitrizing nitrogen oxides contained in waste gas which contains a substantial amount of arsenic compounds therein, which comprises:

(a) titanium, and
(b) at least one element selected from the group consisting of arsenic and manganese.

The catalyst of the invention contains arsenic in amounts of about 0.01-35 parts by weight, preferably of about 0.05-7.5 parts by weight, in terms of weight as $As_2O_3$, or manganese in amounts of about 1-110 parts by weight, preferably of about 1-25 parts by weight, in terms of weight as $MnO_2$, or both, in relation to 100 parts by weight of titanium in terms of weight as $TiO_2$.

A further catalyst is provided according to the invention, which comprises:

(a) titanium,
(b) at least one element selected from the group consisting of arsenic and manganese, and
(c) at least one base metal selected from the group consisting of V, W, Mo, Cu, Fe, Cr, Co, Ni, Zn and Sn.

The second catalyst of the invention contains arsenic in amounts of about 0.01-15 parts by weight, preferably of about 0.05-7.5 parts by weight, in terms of weight as $As_2O_3$, or manganese in amounts of amount 1-85 parts by weight, preferably of about 1-25 parts by weight, in terms of weight as $MnO_2$, or both, in relation to 100 to parts by weight of titanium in terms of weight as of $TiO_2$, but the second catalyst further contains at least one base metal selected from the group consisting of V, W, Mo, Cu, Fe, Cr, Co, Ni, Zn and Sn, alone or in combination thereof in amounts of about 0.05-80 parts by weight, preferably of about 0.05-40 parts by weight, in terms of weights as $TiO_2$, $As_2O_3$, $V_2O_5$, $WO_3$, $MoO_3$, $CuO$, $Fe_2O_3$, $Cr_2O_3$, $NiO$, $ZnO$ or $SnO_2$, respectively, in relation to 100 parts by weight of titanium in terms of weight as $TiO_2$.

In either the first of the second catalyst, when the elements are contained in amounts less or more than the above specified, the resultant catalysts are deactivated by arsenic compounds contained in waste gas within a short period of time, or the catalysts are too low in initial catalytic activity.

It is preferred that the elements are contained in the catalyst in the form of oxides. In particular, when titanium is contained as titanium dioxide in the catalyst, the titanium dioxide has crystallites preferably of 100-250 Å so that the catalyst has a high denitrizing activity. The titanium in the catalyst of the invention may be in part replaced by Si or Zr or both.

In the second catalyst also, the base metals are contained preferably as oxides in the catalyst.

The catalyst of the invention may be produced in any conventional manner known in the art. Some methods are as follows, for example:

(a) Titanium dioxide is first molded into a desired shape, and then the mold is impregnated with compounds of arsenic, manganese or base metals. Hereinafter, titanium oxides or the compounds of the other elements such as arsenic, manganese or base metals may be referred to as the components. In this method, the titanium dioxide mold may be impregnated with all the components at the same time, or the mold is first impregnated with one component, dried or calcined, and then with the other components, and dried or calcined. The order of impregnation is not specifically limited.

(b) Titanium dioxide and the other components are kneaded together, molded to a desired shape, and dried or calcined.

(c) Titanium dioxide and one of the components are kneaded together, molded to a desired shape, dried, calcined, and then impregnated with the other components, and dried or calcined.

(d) Titanium dioxide precursors such as metatitanic acid or orthotitanic acid which are converted into titanium dioxide by heating are mixed with aqueous solutions of the other components, and the resultant mixture is dried, calcined, pulverized and molded.

(e) Aqueous solutions of titanium dioxide precursors such as titanium tetrachloride or titanium sulfate are mixed with aqueous solutions of the other components, and the resultant coprecipitates are separated by filtration, washed with water, dried, calcined, pulverized and molded.

among the methods as above, the methods (d) and (e) are preferred. However, when it is desired that catalytically active components be contained in a high concentration in the surface layer of the catalyst so that the catalyst has a high initial denitrizing activity, the following method (f) is preferred.

(f) A titanium dioxide mold is immersed in or impregnated with aqueous solutions of the other components, and then the mold is rapidly dried.

In the production of the catalyst of the invention, titanium dioxide and various precursors of titanium dioxide such as titanic acid, titanium hydroxide, titanium sulfate or titanium tetrachloride as described hereinbefore may be usable as titanium components. Furthermore, precipitates obtained by reacting titanium compounds such as titanium halides or titanium sulfate with water, ammonia water or alkali carbonates may also be usable as titanium components.

As manganese components are usable manganese oxides and other manganese oxide precursors which are converted into manganese oxides by heating. Such precursors include, for example, manganese nitrate, manganese carbonate and manganese organic carboxylates. Manganese oxides which are obtained by reacting manganese salts with alkalis to form precipitates, converting them to hydroxides, and then by heating and oxidizing the hydroxides are also usable as manganese components in the invention. Manganese oxides are known to have various structures and various oxygen contents depending upon the methods by which they are produced, however, manganese oxides produced by either methods are usable in the invention.

As arsenic components are usable diarsenic trioxide, diarsenic pentoxide, arsenic chlorides, arsenic, arsenic acid, or arsenious acid. Arsenic components may be incorporated into catalysts by, for example, immersing titanium dioxide mold in aqueous solutions of arsenic compounds. As a further method, arsenic compounds are heated and sublimed or evaporated, and then the vapor is put into contact with a titanium dioxide mold.

Various base metal compounds are usable as base metal components, however, base metal compounds which provide oxides by heating are preferably used, similarly to the case of manganese compounds.

The catalyst of the invention may contain clay substances such as montmorillonite, terra abla, bentonite, kaolite, halloysite or sericite; inorganic oxides such as porous silica, alumina, silica, magnesia or zirconia; and heat-resistant inorganic fibers such as glass wool, glass fibers, rock wool or other ceramic fibers, to improve moldability of mixtures of the components in the production of the catalysts, or to provide a high mechanical strength with the catalysts obtained. These additives may be contained in the catalyst in amounts of not more than about 40% by weight based on the weight of the catalyst.

Molding auxiliaries such as binders or other agents or substances, for instance, to make the resultant catalyst porous, may also be used in the production of the catalyst of the invention. Such molding auxiliaries are substances which are burn out in the calcination of the catalyst and are known in the art. They include, for example, crystalline cellulose, acrylic fibers, silk fibers, ammonium carbonate, urea, ammonium stearate, methyl cellulose, polyvinyl alcohol, polyethylene oxide, polystyrene, lactose, corn starch and wheat flour.

The catalyst of the invention is not specifically limited in shapes and dimensions, but may be in any shape of any dimensions, and therefore, it may be in the form of pellets, spheres, plates, tubes or honeycombs, for example. Any molding method is adoptable in the production of the catalyst. By way of example, extrusion, tableting or tumbling granulation may be employed depending upon the required properties.

According to the invention, there is provided a method for denitrizing nitrogen oxides contained in waste gas which contains a substantial amount of arsenic compounds as well therein, which comprises putting the waste gas into contact with the catalyst as described hereinbefore in the presence of a reducing gas, at elevated temperatures, thereby to convert the nitrogen oxides, which include nitrogen monoxide, dinitrogen trioxide, nitrogen dioxide and nitrogen hexaoxide, into innoxious compounds.

The use of the catalyst of the invention for denitrizing nitrogen oxides in waste gas permits the retention of high initial denitrizing activity of the catalyst even when the waste gas contains a substantial amount or arsenic compounds therein.

In the method of the invention, the reducing gas may be either hydrogen, hydrocarbons, carbon monoxide or ammonia, however, ammonia is most preferred as described hereinbefore. The amount of the reducing gases used is usually not more than about 10 times, and is preferably in the range of about 0.2–2 times, as much as the stoichiometric amount needed to reduce the nitrogen oxides contained in waste gas. When ammonia gas is used, it is preferred that the amount is not more than the stoichiometric amount needed to reduce the nitrogen oxides contained in waste gas to prevent secondary pollution due to unreacted ammonia. The most advantageous amount of ammonia is in the range of 0.2–1.0 times as much as the stoichiometric amount needed to reduce the nitrogen oxides in waste gas.

In the method of the invention, the waste gas is put into contact with the catalyst preferably at temperatures of about 100°–550° C., more preferably of about 200°–500° C., most preferably of about 250°–400° C., in the presence of a reducing gas. Usually the waste gas is passed through as a mixture with a reducing gas a reactor having the catalysts fitted therein. The space velocity of the gas mixture is preferably in the range of 1000–1,000,000 $hr^{-1}$, more preferably 2000–50,000 $hr^{-1}$, most preferably 3000–30,000 $hr^{-1}$ at pressures of about 1–10 $kg/cm^2$.

The catalyst and method of the invention are suitably applicable to denitrizing of waste gas which contains nitrogen oxides and arsenic compounds, and they are especially useful when used for denitrization of combustion waste gas which contains about 100–1000 ppm of nitrogen oxides, mainly nitrogen monoxide, about 200–2000 ppm of sulfur oxides, mainly sulfur dioxide, about 1–10% by volume of oxygen, about 5–20% by volume of carbon dioxide, about 5–20% by volume of water vapor, and a substantial amount of arsenic compounds, i.e. not less than about 0.001 ppm. The catalyst and method of the invention are most useful when they are used for denitrization of combustion waste gas from coal-fueled boilers which contains arsenic oxides, mainly diarsenic trioxide, in amounts of about 0.01–10. ppm since when the conventional catalysts are used to denitrize such waste gases, they are deactivated within a very short time of period. However, the method of the invention is not specifically limited in the concentration of arsenic oxides in waste gases.

The invention will be more easily understood with reference to the following examples, which however are intended to illustrate the invention only and not to be construed as limiting the scope of the invention.

EXAMPLE 1

Metatitanic acid obtained as an intermediate in the production of titanium dioxide by sulfuric acid process was neutralized, filtered and washed with water to provide metatitanic acid cake. To 800 kg (in terms of titanium dioxide) of metatitanic acid were added 8 kg of 67.5% nitric acid solution to peptize in part the metatitanic acid. The resultant sol of metatitanic acid was spray dried and then calcined at 450° C. for 3 hours, followed by pulverizing to provide titanium dioxide powders of about 2 μm in average particle size.

An amount of 300 liters of an aqueous solution containing monoethanolamine, 100 kg of ammonium paratungstate and 2.1 kg of arsenious acid was added to 800 kg of the titanium dioxide powders together with 50 kg of polyvinyl alcohol, 100 kg of glass chopped strands of 5 mm in fibers length and 9 μm in diameter (Nitto Boseki K.K., Japan) and about 100 liters of water, and the resultant mixture was kneaded.

The kneaded mixture was then molded into a honeycomb structure by use of a vacuum screw extruder provided with a honeycomb forming nozzle. The thus obtained mold was left standing for drying for sufficient period of time, and then air dried at 100° C. for 5 hours. The mold was then cut at both axial ends to a predetermined length, and calcined at 450° C. for 3 hours in an electric oven, to provide a honeycomb mold of 7.4 mm in cell pitch, 1.35 mm in wall thickness, 150 mm×150 mm in outer diameter, 500 mm in axial length and 5.9 mm in equivalent diameter.

An amount of 19.2 kg of oxalic acid and 7.7 kg of ammonium metavanadate were added to water to form an aqueous solution in an amount of 40 liters or in concentration of 150 g/l of vanadium pentoxide, which was diluted to a concentration of 17.9 g/l with water.

The honeycomb mold obtained as above was immersed in the above diluted ammonium metavanadate solution at normal temperatures, air dried at normal temperatures for 2.5 hours, heated to 100° C. in 5 hours and dried at the temperature for 5 hours, to provide a honeycomb structure catalyst.

The catalyst was found to contain Ti, W, V and As in amounts of 89.3%, 9.9%, 0.6% and 0.23% in terms of $TiO_2$, $WO_3$, $V_2O_5$ and $As_2O_3$, respectively, based on the total weight of metal components in the catalyst, i.e., W, V and As in amounts of 11.1 parts by weight, 0.7% parts by weight and 0.26 parts by weight in terms of weight as $WO_3$, $V_2O_5$ and $As_2O_3$, respectively, in relation to 100 parts by weight of Ti in terms of weight as $TiO_2$.

REFERENCE EXAMPLE 1

A catalyst was prepared without incorporating arsenious acid thereinto and otherwise in the same manner as in Example 1.

The catalyst was found to contain Ti, W and V in amounts of 89.5%, 9.9% and 0.6% in terms of $TiO_2$, $WO_3$ and $V_2O_5$, respectively, based on the total weight of metal components in the catalyst, i.e., W and V in amounts of 11.1 parts by weight and 0.7 parts by weight in terms of weight as $WO_3$ and $V_2O_5$, respectively, in relation to 100 parts by weight of Ti in terms of weight as $TiO_2$.

EXAMPLE 2

An amount of 300 liters of an aqueous solution containing 51.6 kg of oxalic acid and 20.7 kg of ammonium metavanadate was used in place of the aqueous solution containing monoethanolamine, ammonium paratungstate and arsenious acid in Example 1, and a honeycomb structure having the same dimensions was prepared in the same manner as in Example 1.

The honeycomb structure was immersed in a 5.2 g/l aqueous solution of arsenious acid at normal temperatures, dried in the same manner as in Example 1, and then dried at 450° C. in an electric oven for 3 hours, to provide a honeycomb catalyst.

Arsenic was found to be distributed uniformly throughout the honeycomb structure by analysis by means of an X ray microanalyzer.

The catalyst was found to contain Ti, V and As in amounts of 97.8%, 2.0% and 0.17% in terms of $TiO_2$, $V_2O_5$ and $As_2O_3$, respectively, based on the total weight of metal components in the catalyst, i.e., V and As in amounts of 2.0 parts by weight and 0.17 parts by weight in terms of weight as $V_2O_5$ and $As_2O_3$, respectively, in relation to 100 parts by weight of Ti in terms of weight as $TiO_2$.

REFERENCE EXAMPLE 2

A catalyst was prepared without incorporating arsenious acid thereinto and otherwise in the same manner as in Example 2.

The catalyst was found to contain Ti and V in amounts of 98.0% and 2.0% in terms of $TiO_2$ and $V_2O_5$, respectively, based on the total weight of metal components in the catalyst, i.e., V in amounts of 2.0 parts by weight in terms of weight as $V_2O_5$ in relation to 100 parts by weight of Ti in terms of weight as $TiO_2$.

DENITRIZING RATE MEASUREMENTS 1

Each of the catalysts prepared in Examples 1 and 2, and Reference Examples 1 and 2 was cut into a honeycomb of 300 mm in length and having nine openings extending therethrough in 3×3 cells.

A gas mixture composed of 200 ppm of nitrogen oxides, 200 ppm of ammonia, 4% by volume of oxygen, 10% by volume of water vapor, 12% by volume of carbon dioxide, 800 ppm of sulfur dioxide, 25 ppm of $As_2O_3$ vapor and the balance nitrogen was put into contact with each catalyst at 380° C. at a space velocity of 4700 $hr^{-1}$ for 5 hours, and denitrizing rates of the catalyst were measured.

The denitrizing rate is defined by ((NOx concentration at the inlet of a reactor)−(NOx concentration at the outlet of a reactor)/(NOx concentration at the inlet of a reactor))×100 (%). (Equation 1)

The results are shown in Table 1.

TABLE 1

| Catalysts | Denitrizing Rates (%) |
| --- | --- |
| Example 1 | 93.5 |
| Example 2 | 95.5 |
| Reference Example 1 | 82.6 |
| Reference Example 2 | 86.1 |

EXAMPLE 3

An amount of 210 g of barium chloride ($BaCl_2 \cdot 2H_2O$) was added to 5 kg (in terms of $TiO_2$) of metatitanic acid obtained as an intermediate in the production of titanium dioxide by sulfuric acid process and composed of 40.4–49.0% by weight of $TiO(OH)_2$ (33–40% by weight in terms of $TiO_2$), 2.0–3.2% by weight of $H_2SO_4$ (6.1–9.8% by weight based on $TiO_2$) and 47.8–57.6% by weight of water. The resultant mixture was dried at 110° C. for 12 hours, and was then calcined at 600° C. for 3 hours. Cellulose fibers "Pulpfloc" (Sanyo Kokusaku Pulp K.K., Japan) were added to the calcined to the calcined product in amounts of 60 g in relation to 1 kg of the calcined product, and the resultant mixture was dry blended and milled by use of an atomizer with 2 mm-screens, to provide titanium dioxide powders mixed with cellulose fibers.

To an amount of 100 g (in terms of $TiO_2$) of the aforementioned metatitanic acid were added 24 g of barium chloride ($BaCl_2 \cdot 2H_2O$). The resultant mixture was fully stirred and then water was added thereto to form a titanium hydroxide sol in a concentration of 200 g/l. The sol and the aforesaid titanium dioxide powders mixed with cellulose fibers were admixed and granulated to spherical molds of 3.3 mm in average particle size. These molds were dried at 110° C. for 12 hours and calcined at 600° C. for 3 hours, to provide titanium dioxide spheres.

The titanium dioxide spheres were immersed in a 592 g/l aqueous solution of manganese nitrate ($Mn(NO_3)_2 \cdot 6H_2O$) for 10 minutes, dried at 100° C., and calcined at 450° C. for 3 hours, to provide a catalyst of the invention.

The catalyst was found to contain Ti and Mn in amounts of 94.6% and 5.4% in terms of $TiO_2$ and $MnO_2$, respectively, based on the total weight of metal components in the catalyst, i.e., Mn in amounts of 5.7 parts by weight in terms of weight as $MnO_2$ in relation to 100 parts by weight of Ti in terms of weight as $TiO_2$.

REFERENCE EXAMPLE 3

An amount of 216 g of ammonium metavanadate and 538 g of oxalic acid were added to water for form a solution in an amount of 1 liter. The titanium dioxide spheres as obtained in Example 3 were immersed in the above solution, dried and calcined in the same manner as in Example 3, to provide a catalyst.

The catalyst was found to contain Ti and V in amounts of 94.5% and 5.5% in terms of $TiO_2$ and $V_2O_5$, respectively, based on the total weight of metal components in the catalyst, i.e., V in amounts of 5.8 parts by weight in terms of weight as $V_2O_5$ in relation to 100 parts by weight of Ti in terms of weight as $TiO_2$.

DENITRIZING RATE MEASUREMENTS 2

Denitrizing rates of the catalysts produced in Example 3 and Reference Example 3 were measured.

A gas mixture composed of 100 ppm of nitrogen oxides, 100 ppm of ammonia, 9.1% by volume of water vapor, 12% by volume of carbon dioxide, 800 ppm of sulfur dioxide, 4% by volume of oxygen, 25 ppm of arsenious acid gas and the balance nitrogen was put into contact with each of the catalyst prepared in Example 3 and Reference Example 3 at 350° C. or at 380° C. at a space velocity of 10000 hr$^{-1}$ for 5 hours. The denitrizing rates were measured according to the Equation 1 hereinbefore defined, and the results are shown in Table 2.

TABLE 2

| Catalysts | Denitrizing Rates (%) | |
|---|---|---|
| | at 350° C. | at 380° C. |
| Example 3 | 87.1 | 90.2 |
| Reference Example 3 | 66.2 | 81.6 |

EXAMPLE 4

Production of Honeycomb Carriers 1

An aqueous solution of $TiOSO_4$ in a concentration of 15% by weight (in terms of $TiO_2$) was cooled below 20° C., and a 15% aqueous ammonia solution was gradually added thereto, to adjust the pH of the solution to 8. The resultant precipitates of titanium hydroxide were filtered and washed with water until no sulfate ions were detected in the filtrates, and then dried and calcined at 500° C. for 3 hours, to provide titanium dioxide powders.

An amount of 80 parts by weight of the titanium dioxide powders was mixed with 15 parts by weight of acidic terra abla, 5 parts by weight of glass fibers and water, and was fully kneaded together. After adjusting the water content, the mixture was molded into honeycomb molds having openings of 6.0 mm in diameter in the form of square and walls of 1.35 mm in thickness. The honeycomb molds were dried and calcined at 500° C. for 3 hours, to form honeycomb carriers 1.

CATALYSTS WITH HONEYCOMB CARRIERS 1

Saturated water content of the honeycomb carriers 1 were measured. Aqueous solutions of manganese nitrate were prepared so that manganese nitrate was supported on the honeycomb carries in amounts of 1%, 5% and 10% by weight in terms of $MnO_2$ based on the weight of the catalyst, respectively, in accordance with the saturated water content of the honeycomb carriers. The honeycomb carriers were then immersed in the solutions, respectively, dried and calcined at 500° C. for 3 hours.

Similarly to the above, an aqueous solution of ammonia alkaline diarsenic trioxide was prepared so that diarsenic trioxide was supported on the carriers in an amount of 1% by weight in terms of $As_2O_3$. The aforesaid honeycomb carriers having $MnO_2$ supported thereon were immersed in diarsenic trioxide solution, dried and calcined at 500° C. for 3 hours, to provide catalysts 1–3 as shown in Table 3.

PRODUCTION WITH HONEYCOMB CARRIERS 2

An aqueous solution containing oxalic acid and ammonium metavanadate were prepared so that ammonium metavanadate was supported on the honeycomb carriers 1 in amounts of 0.5% by weight in terms of $V_2O_5$ in accordance with the saturated water content of the carriers 1. The honeycomb carries 1 were then immersed in the solution, dried and calcined at 500° C. for 3 hours, to provide honeycomb carriers 2.

In the same manner as in the catalysts 1–3, manganese nitrate was supported on the carriers 2 in amounts of 1%, 5% and 10% by weight in terms of $MnO_2$ based on the catalyst, respectively, and then arsenic oxides were supported in an amount of 1% in terms of $As_2O_3$ based on the catalyst to provide catalysts 1'–3'.

EXAMPLE 5

On the aforementioned honeycomb carries 1 was supported manganese nitrate in an amount of 5% by weight in terms of $MnO_2$, and then arsenic was further supported thereon in amounts of 3% and 5% by weight in terms of $As_2O_3$, respectively, in the same manner as in Example 4, to provide catalysts 4 and 5.

Similarly to the above, manganese nitrate was supported on the aforementioned honeycomb carriers 2 in an amount of 5% by weight in terms of $MnO_2$, and then arsenic was supported thereon in amounts of 3% and 5% by weight in terms of $As_2O_3$, respectively, in the same manner as in Example 4, to provide catalysts 4' and 5'.

EXAMPLE 6

On the aforementioned honeycomb carriers 1 was supported arsenic oxides in an amount of 1% by weight in terms of $As_2O_3$, and then manganese nitrate was further supported thereon in amounts of 3% and 5% by weight in terms of $MnO_2$, respectively, in the same manner as in Example 4, to provide catalysts 6 and 7.

Similarly to the above, arsenic oxides were supported on the aforementioned honeycomb carriers 2 in an amount of 1% by weight in terms of $As_2O_3$, and then manganese nitrate was further supported thereon in amounts of 1% and 5% by weight in terms of $MnO_2$, respectively, in the same manner as in Example 4, to provide 6' and 7'.

EXAMPLE 7

On the aforementioned honeycomb carriers 1 was supported $MnO_2$ in amounts of 5% by weight by an immersing method as described in Example 4, and then $As_2O_3$ in amounts of 1% and 2% by weight, respectively, by depositing $As_2O_3$ gas on the carriers, which is called herein a CVD method, to provide catalysts 8 and 9.

Meanwhile $MnO_2$ was supported in amounts of 5% on the aforementioned honeycomb carriers 2 by the immersing method, and then $As_2O_3$ in amounts of 1% and 2%, respectively, by the CVD method, to provide catalysts 8' and 9'.

EXAMPLE 8

On the aforementioned honeycomb carriers 1 was supported manganese nitrate in amounts of 1% and 5% by weight in terms of $MnO_2$, to provide catalysts 10 and 11. Meanwhile, diarsenic trioxide was supported on the carriers 1 in amounts of 1% and 3% by weight, respectively, to provide catalysts 12 and 13.

Similarly to the above, on the aforementioned honeycomb carriers 2 was supported $MnO_2$ in amounts of 1% and 5% by weight, to provide catalysts 10' and 11'. Meanwhile, diarsenic trioxide was supported on the carriers 2 in amounts of 1% and 3% by weight, respectively, to provide catalysts 12' and 13'.

EXAMPLE 9

The aforementioned honeycomb carries 1 were immersed in an aqueous solution containing ammonium metavanadate, manganese nitrate and diarsenic pentoxide so that V, Mn and As were supported thereon in amounts of 0.7% by weight in terms of $V_2O_5$, 5% by weight in terms of $MnO_2$ and 1% by weight in terms of $As_2O_3$, respectively, to provide catalysts 14.

REFERENCE EXAMPLE 4

The aforementioned honeycomb carriers 1 were immersed in aqueous solutions containing ammonium metavanadate and ammonium paratungstate, dried and calcined at 500° C. for 3 hours in the air, to provide a catalyst 15 having $V_2O_5$ and $WO_3$ in amounts of 0.5% and 10% by weight based on the catalyst, respectively.

DENITRIZING RATE MEASUREMENTS 3

The catalysts 1-15 and 1'-13' were cut into a honeycomb of 100 mm in length and having four openings extending therethrough in 2×2 cells. The denitrizing activity of each of the catalysts before and after the deactivation with arsenic compounds was measured.

First the denitrizing activity of the catalysts was measured in the absence of arsenic compounds. That is, a gas mixture composed of 200 ppm of nitrogen monoxide, 200 ppm of ammonia, 800 ppm of sulfur dioxide, 5% by volume of oxygen, 12% by volume of carbon dioxide, 10% by volume of water vapor, and the balance nitrogen was fed into the reactor in which a catalyst was fitted at a rate of 300 Nl/hr at 380° C., to determine initial denitrizing rates of the catalysts before the deactivation with $As_2O_3$ vapor.

Then a gas mixture composed of 10 ppm of $As_2O_3$ vapor, 5% volume of oxygen and 1000 ppm of sulfur dioxide was passed through the reactor at a rate of 300 Nl/hr at 380° C. for 120 hours to deactivate the catalyst. The same gas mixture as before containing nitrogen monoxide was again passed though the reactor under the same conditions as before to determine denitrizing rates of the catalyst after the deactivation with $As_2O_3$ vapor. The denitrizing rates were measured according to Equation 1.

The denitrizing rates before and after the deactivation with $As_2O_3$ vapor are shown in Tables 3 and 4. The catalysts 1-9 composed of titanium dioxide carriers having manganese oxides and arsenic oxides supported thereon were found to substantially retain their initial denitrizing activity after the deactivation with $As_2O_3$ vapor. The catalysts 10-14 which were composed of titanium dioxide carriers having either manganese oxides or arsenic oxides only supported thereon were similarly found to substantially retain their initial denitrizing activity after the deactivation with $As_2O_3$ vapor.

Further the catalysts 1'-13' composed of carriers which contained titanium dioxide and vanadium oxide, and had manganese oxides or arsenic oxides or both supported thereon were also found to substantially retain their initial denitrizing activity after the deactivation.

However, the conventional catalyst 15 was found to be remarkably reduced in the denitrizing activity after the deactivation.

TABLE 3

| | Catalysts[1] | | Denitrizing Rates (%) | |
|---|---|---|---|---|
| | | | Before | After |
| No. | Compositions[2] | Relative Compositions[3] | Deactivation | |
| 1 | $As_2O_3(1)$—$MnO_2(1)$—$TiO_2(78.4)$ | 1.3/12.8/100 | 73 | 72 |

TABLE 3-continued

| | Catalysts[1] | | Denitrizing Rates (%) | |
|---|---|---|---|---|
| | | | Before | After |
| No. | Compositions[2] | Relative Compositions[3] | Deactivation | |
| 2 | $As_2O_3(1)$—$MnO_2(5)$—$TiO_2(75.2)$ | 1.3/6.6/100 | 74 | 74 |
| 3 | $As_2O_3(1)$—$MnO_2(10)$—$TiO_2(71.2)$ | 1.4/14/100 | 72 | 70 |
| 4 | $As_2O_3(3)$—$MnO_2(5)$—$TiO_2(73.6)$ | 4.1/6.8/100 | 74 | 71 |
| 5 | $As_2O_3(5)$—$MnO_2(5)$—$TiO_2(72.0)$ | 6.9/6.9/100 | 73 | 73 |
| 6 | $MnO_2(1)$—$As_2O_3(1)$—$TiO_2(78.4)$ | 1.3/1.3/100 | 71 | 72 |
| 7 | $MnO_2(5)$—$As_2O_3(1)$—$TiO_2(75.2)$ | 6.6/1.3/100 | 70 | 71 |
| 8 | $As_2O_3(1)$—$MnO_2(5)$—$TiO_2(75.2)$ (by CVD) | 1.3/6.6/100 | 76 | 75 |
| 9 | $As_2O_3(2)$—$MnO_2(5)$—$TiO_2(74.4)$ (by CVD) | 2.7/6.7/100 | 75 | 76 |
| 10 | $MnO_2(1)$—$TiO_2(79.2)$ | 1.3/100 | 62 | 72 |
| 11 | $MnO_2(5)$—$TiO_2(76.0)$ | 6.6/100 | 66 | 69 |
| 12 | $As_2O_3(1)$—$TiO_2(79.2)$ | 1.3/100 | 61 | 60 |
| 13 | $As_2O_3(3)$—$TiO_2(77.6)$ | 3.9/100 | 63 | 61 |
| 14 | $V_2O_5(0.7)$—$MnO_2(5)$—$As_2O_3(1)$—$TiO_2(74.6)$ | 0.9/6.7/1.3/100 | 76 | 73 |
| 15 | $V_2O_5(0.5)$—$WO_3(10)$—$TiO_2(71.6)$ | 0.7/14.0/100 | 78 | 36 |

Notes:
[1] No. 1–14 catalysts of the invention, and No. 15 catalyst for reference.
[2] In parentheses are shown elements in % by weight in terms of oxides based on the weight of the catalysts.
[3] Elements in parts by weight in terms of oxides in relation to 100 parts by weight of $TiO_2$.

TABLE 4

| | Catalysts[1] | | Denitrizing Rates (%) | |
|---|---|---|---|---|
| | | | Before | After |
| No. | Compositions[2] | Relative Compositions[3] | Deactivation | |
| 1' | $As_2O_3(1)$—$MnO_2(1)$—$V_2O_5(0.5)$—$TiO_2(78.0)$ | 1.3/1.3/0.6/100 | 74 | 73 |
| 2' | $As_2O_3(1)$—$MnO_2(5)$—$V_2O_5(0.5)$—$TiO_2(74.8)$ | 1.3/6.7/0.7/100 | 76 | 71 |
| 3' | $As_2O_3(1)$—$MnO_2(10)$—$V_2O_5(0.5)$—$TiO_2(70.8)$ | 1.4/14.1/0.7/100 | 77 | 72 |
| 4' | $As_2O_3(3)$—$MnO_2(5)$—$V_2O_5(0.5)$—$TiO_2(73.2)$ | 4.1/6.8/0.7/100 | 76 | 71 |
| 5' | $As_2O_3(5)$—$MnO_2(5)$—$V_2O_5(0.5)$—$TiO_2(71.6)$ | 7.0/7.0/0.7/100 | 78 | 74 |
| 6' | $MnO_2(1)$—$As_2O_3(1)$—$V_2O_5(0.5)$—$TiO_2(78.0)$ | 1.3/1.3/0.6/100 | 72 | 72 |
| 7' | $MnO_2(5)$—$As_2O_3(1)$—$V_2O_5(0.5)$—$TiO_2(74.8)$ | 6.7/1.3/0.7/100 | 74 | 73 |
| 8' | $As_2O_3(1)$—$MnO_2(5)$—$V_2O_5(0.5)$—$TiO_2(74.8)$ (by CVD) | 1.3/6.7/0.7/100 | 72 | 69 |
| 9' | $As_2O_3(2)$—$MnO_2(5)$—$V_2O_5(0.5)$—$TiO_2(74.0)$ (by CVD) | 2.7/6.8/0.7/100 | 69 | 68 |
| 10' | $MnO_2(1)$—$V_2O_5(0.5)$—$TiO_2(78.8)$ | 1.3/0.6/100 | 80 | 74 |
| 11' | $MnO_2(5)$—$V_2O_5(0.5)$—$TiO_2(75.6)$ | 6.6/0.7/100 | 81 | 77 |
| 12' | $As_2O_3(1)$—$V_2O_5(0.5)$—$TiO_2(78.8)$ | 1.3/0.6/100 | 71 | 70 |
| 13' | $As_2O_3(3)$—$V_2O_5(0.5)$—$TiO_2(77.2)$ | 3.9/1.9/100 | 70 | 69 |
| 15 | $V_2O_5(0.5)$—$WO_3(10)$—$TiO_2(71.6)$ | 0.7/7.0/100 | 78 | 36 |

Notes:
[1] No. 1'–13' catalysts of the invention, and No. 15 catalyst for reference.
[2] In parentheses are shown elements in % by weight in terms of oxides based on the weight of the catalysts.
[3] Elements in parts by weight in terms of oxides in relation to 100 parts by weight of $TiO_2$.

EXAMPLE 10

The aforementioned honeycomb carries 1 produced in Example 4 were immersed in an aqueous solution of ammonium paratungstate, dried and calcined at 500° C. for 3 hours, and then immersed in an aqueous solution of manganese nitrate, dried and calcined at 500° C. for 3 hours, to provide a catalyst 16.

The catalyst was found to contain Ti, W and Mn in amounts of 68%, 10% and 5% in terms of $TiO_2$, $WO_3$ and $MnO_2$, respectively, based on the total weight of the catalyst, i.e., W and Mn in amounts of 14.7 parts by weight and 9.3 parts by weight in terms of weight as $WO_3$ and $MnO_2$, respectively, in relation to 100 parts by weight of Ti in terms of weight as $TiO_2$.

EXAMPLE 11

In the same manner as in Example 10, ammonium paratungstate was supported on the honeycomb carriers 1, and then the carries were immersed in an aqueous ammonia-alkaline solution of $As_2O_3$, dried, and calcined at 500° C. for 3 hours, to provide a catalyst 17.

The catalyst was found to contain Ti, W and As in amounts of 68%, 10% and 3% in terms of $TiO_2$, $WO_3$ and $As_2O_3$, respectively, based on the total weight of the catalyst, i.e., W and As in amounts of 14.7 parts by weight and 4.4 parts by weight in terms of weight as $WO_3$ and $As_2O_3$, respectively, in relation to 100 parts by weight of Ti in terms of weight as $TiO_2$.

DENITRIZING RATE MEASUREMENTS 4

The denitrizing rates of the honeycomb catalysts 16 and 17 were measured in the same manner as in Denitrizing Rate Measurement 3 except that the gas mixture containing nitrogen monoxide was passed through the reactor at a rate of 120 Nl/hr. The results are shown in Table 5.

TABLE 5

| | Denitrizing Rates (%) | |
|---|---|---|
| | Before | After |
| Catalyst No. | Deactivation | |
| 16 | 72 | 70 |
| 17 | 70 | 69 |

EXAMPLE 12

An aqueous solution of 86 g of manganese nitrate ($Mn(NO_3)_2.6H_2O$) in 200 ml of deionized water was added to 240 g (in terms of $TiO_2$) of a slurry of metatitanic acid ($TiO(OH)_2$). the resultant mixture was wet kneaded for 30 minutes and dried at 100° C.

After calcining at 400° C. for 2 hours, the product was mixed with polyethylene oxide "Alcox E-30" (Meisei Kasei Kogyo K.K., Japan) in an amount of 1% by weight, 0.5 g of diarsenic trioxide and an amount of water. The resultant mixture was wet kneaded and then extruded into cylindrical molds of 6 mm in diameter, which were then dried and calcined at 500° C. for 4 hours, to provide a catalyst.

The catalyst was found to be composed of 90.2%, 9.8% and 0.1% by weight of Ti, Mn and As, respectively, in terms of $TiO_2$, $MnO_2$ and $As_2O_3$, respectively, based on the total weight of the catalyst, i.e., Mn and As in amounts of 10.9 parts by weight and 0.1 parts by weight in terms of weight as $MnO_2$ and $As_2O_3$, respectively, in relation to 100 parts by weight of Ti in terms of weight as $TiO_2$.

The denitrizing rates were measured with the catalyst in the same manner as in Denitrizing Rate Measurements 3. It was found that the catalyst had denitrizing rates of 70.1% and 71.3% before and after the deactivation with $As_2O_3$ vapor, respectively.

EXAMPLE 13

An aqueous solution of 172 g of manganese nitrate $(Mn(NO_3)_2 \cdot 6H_2O)$ in 300 ml of deionized water was added to 240 g (in terms of $TiO_2$) of a slurry of metatitanic acid. The resultant mixture was wet kneaded for 30 minutes and dried at 100° C.

After calcining at 400° C. for 2 hours, the product was mixed with polyethylene oxide "Alcox E-30" in an amount 1% by weight, 0.3 g of diarsenic trioxide and an amount of water. The resultant mixture was wet kneaded and then extruded into cylindrical molds of 6 mm in diameter, which were then dried and calcined at 500° C. for 4 hours, to provide a catalyst.

The catalyst was found to be composed of 82.1%, 17.8% and 0.1% by weight of Ti, Mn and As, respectively, in terms of $TiO_2$, $MnO_2$ and $As_2O_3$, respectively, based on the total weight of the catalyst, i.e., Mn and As in amounts of 21.7 parts by weight and 0.1 parts by weight in terms of weight as $MnO_2$ and $As_2O_3$, respectively, in relation to 100 parts by weight of Ti in terms of weight as $TiO_2$.

The denitrizing rates were measured with the catalyst in the same manner as in Denitrizing Rate Measurements 3. The catalyst was found to have denitrizing rates of 83.2% and 81.7% before and after the deactivation with $As_2O_3$ vapor, respectively.

EXAMPLE 14

An aqueous solution of 172 g of manganese nitrate $(Mn(NO_3)_2 \cdot 6H_2O)$ in 300 ml of deionized water was added to 240 g (in terms of $TiO_2$) of a slurry of metatitanic acid. The resultant mixture was wet kneaded for 30 minutes and dried at 100° C.

After calcining at 400° C. for 2 hours, the product was mixed with polyethylene oxide "Alcox E-30" in an amount of 1% by weight and an amount of water, wet kneaded and then extruded into cylindrical molds of 6 mm in diameter. The mold was dried and calcined at 500° C. for 4 hours, to provide a catalyst.

The catalyst was found to be composed of 82.2% by weight of Ti and 17.8% by weight of Mn in terms of $TiO_2$ and $MnO_2$, respectively, based on the total weight of the catalyst, i.e., Mn in amounts of 21.7 parts by weight in terms of weight as $MnO_2$ in relation to 100 parts be weight of Ti in terms of weight as $TiO_2$.

The denitrizing rates were measured with the catalyst in the same manner as in Denitrizing Rate Measurements 3, and the catalyst was found to have denitrizing rates of 43.5% and 80.3% before and after the deactivation with $As_2O_3$ vapor, respectively.

The catalyst thus deactivated with $As_2O_3$ vapor was further subjected to the same measurements as in Denitrizing Rate Measurements 3, and was found to have a denitrizing rate of 81.1% after the deactivation with $As_2O_3$ vapor.

EXAMPLE 15

An amount of 20 kg (in terms of $TiO_2$) of metatitanic acid obtained as an intermediate in the production of titanium dioxide by sulfuric acid process was mixed with 2.45 kg of ammonium paramolybdate and fully stirred. To the resultant mixture were added ammonia water to adjust the pH to 4.0, and then 2 liters of an aqueous solution of monoethanolamine, and the resultant mixture was fully stirred.

The resultant slurry was then spray dried, calcined at 350° C. for 5 hours, to provide powders of mixtures of titanium dioxide and molybdenum trioxide.

An amount of 18 kg of the powder mixture was mixed together with 600 g of carboxymethyl cellulose, 250 g of polyvinyl alcohol, 1.44 kg of glass fibers and 1.75 liters of water, and the resultant mixture was fully kneaded. The mixture was then molded into a honeycomb structure by use of a vacuum screw extruder, left standing for drying for sufficient period of time, and then air dried at 100° C. for 5 hours.

The honeycomb mold was then cut at both axial ends to a predetermined length, and calcined at 450° C. for 3 hours in an electric oven, to provide a honeycomb structure of 7.4 mm in cell pitch, 1.35 mm in wall thickness, 55 mm×55 mm in outer diameter and 500 mm axial length.

The honeycomb structure was then immersed in 40 liters of a 40% by weight aqueous solution of manganese nitrate $(Mn(NO_3)_2)$ for 15 minutes, dried overnight, heated to 400° C. in 5 hours and calcined at 450° C. for 3 hours, to provide a honeycomb catalyst.

The catalyst was found to be composed of 77.9% of Ti, 7.7% of Mo and 7.5% of Mn by weight in terms of $TiO_2$, $MoO_3$ and $MnO_2$, and 6.9% by weight of glass fibers based on the total weight of the catalyst, i.e., Mo and Mn in amounts of 9.9 parts by weight and 9.6 parts by weight in terms of weight as $MoO_3$ and $MnO_2$, respectively, in relation to 100 parts by weight of Ti in terms of weight as $TiO_2$.

EXAMPLE 16

An amount of 3 kg of arsenic acid $(As_2O_5)$ was dissolved in 40 liters of deionized water at 80° C. The same $TiO_2$—$MoO_3$ honeycomb structure as in Example 15 was immersed in the aqueous solution of arsenic acid for 15 minutes, dried at room temperatures overnight, and calcined at 300° C. for 3 hours.

The resultant catalyst was found to be composed of 82.3% by weight of $TiO_2$, 8.1% by weight of $MoO_3$ and 2.3% by weight of $As_2O_5$, and 7.3% by weight of glass fibers. That is, the catalyst was found to contain Mo and As in amounts of 9.8 parts by weight and 2.8 parts by weight in terms of weight as $MoO_3$ and $As_2O_5$, respectively, in relation to 100 parts by weight of Ti in terms of weight as $TiO_2$.

DENITRIZING RATE MEASUREMENTS 5

The denitrizing rates of the catalysts produced in Examples 15 and 16 before and after the deactivation with $As_2O_3$ were measured in the following method.

An apparatus for deactivating catalysts with $As_2O_3$ is illustrated in the single figure. The apparatus includes a gas flow regulator 1, a damper 2, an electric oven 3 and an $As_2O_3$ collector 4. The electric oven includes a tube 5 having a catalyst heating section 6 and an $As_2O_3$ powder heating section 7. At the catalyst heating section a catalyst 8 is heated to a desired temperature adopted in denitrization of waste gas. At the $As_2O_3$ powder heating section, $As_2O_3$ powder 9 is heated to a desired temperature so as to produce $As_2O_3$ vapor. Suitable concentrations of $As_2O_3$ vapor are obtained by heating the powder to temperatures usually in the range of about 250°–400° C.

A gas mixture having a predetermined composition is supplied to the tube 5 in the electric oven through the regulator 1 and damper 2, whereas $As_2O_3$ powder and a catalyst are heated so that the mixture gas containing $As_2O_3$ vapor in a predetermined concentration is passed through the catalyst heating section to deactivate the catalyst with $As_2O_3$ vapor.

By way of example, a gas mixture composed of about 50 ppm of $As_2O_3$, 1000 ppm of sulfur dioxide, 5% by volume of oxygen, 10% by volume of water vapor and the balance nitrogen was passed through the tube at a rate of 2 liters/minute for 5 hours while the catalyst was heated at 350° C. After deactivating the catalyst in this manner, the catalyst was took out of the apparatus, and left standing to room temperatures.

An amount of 20 ml of the deactivated catalyst was fitted in a quartz tube reactor of 20 mm in diameter, and a gas mixture composed of about 100 ppm of nitrogen monoxide, 100 ppm of ammonia, 800 ppm of sulfur dioxide, 4% by volume of oxygen, 12% by volume of carbon dioxide, 9% by volume of water vapor and the balance nitrogen was passed through the reactor at a rate of 400 Nl/hr, i.e. at a space velocity of 20000 $hr^{-1}$.

The amount of nitrogen monoxide was determined by chemiluminescence detecting method by use of NO/-NOx analyzer 951 (Toshiba-Beckmann K.K., Japan) by determining the concentrations of nitrogen monoxide at the inlet and outlet of the reactor. The results are shown in Table 6.

TABLE 6

| Catalysts | Denitrizing Rates (%) | |
|---|---|---|
| | Before Deactivation | After Deactivation |
| Example 15 | 86.2 | 84.8 |

TABLE 6-continued

| Catalysts | Denitrizing Rates (%) | |
|---|---|---|
| | Before Deactivation | After Deactivation |
| Example 16 | 77.2 | 75.5 |

What is claimed is:

1. A method for denitrizing nitrogen oxides contained in a waste gas which contains arsenic compounds therein in amounts of about 0.01–1.0 ppm, which comprises putting the waste gas into contact with a catalyst essentially consisting of:
   (a) titanium and
   (b) arsenic in amounts of about 0.01–35 parts by weight in terms of weight as $As_2O_3$ in relation to 100 parts by weight of titanium in terms of weight as $TiO_2$, in the presence of a reducing gas at elevated temperatures, thereby to reduce the nitrogen oxides.

2. The method as claimed in claim 1 wherein the catalyst contains arsenic in amounts of about 0.05–75. parts by weight in terms of weight as $As_2O_3$ in relation to 100 parts by weight of titanium in terms of weight as $TiO_2$.

3. The method as claimed in claim 1 wherein the reducing gas is ammonia gas.

4. A method for denitrizing nitrogen oxides contained in a waste gas which contains arsenic compounds therein in amounts of about 0.01–1.0 ppm, which comprises putting the waste gas into contact with a catalyst essentially consisting of:
   (a) titanium,
   (b) arsenic in amounts of about 0.01–35 parts by weight in terms of weight as $As_2O_3$ in relation to 100 parts by weight of titanium in terms of weight as $TiO_2$, and
   (c) at least one base metal selected from the group consisting of W and Mo, in amounts of 0.05–80 parts by weight in terms of weight as $WO_3$ and $MoO_3$, in relation to 100 parts by weight of titanium as $TiO_2$, in the presence of a reducing gas at elevated temperatures, thereby to reduce the nitrogen oxides.

5. The method as claimed in claim 4 wherein the catalyst contains arsenic in amounts of about 0.05–7.5 parts by weight in terms of weight as $As_2O_3$ and the base metal in amounts of 0.05–40 parts by weight in terms of weight as $WO_3$, and $MoO_3$, in relation to 100 parts by weight of titanium in terms of weight as $TiO_2$.

6. The method as claimed in claim 4 wherein the reducing gas is ammonia gas.

7. The method as claimed in claim 4 wherein the temperature is in the range of about 100°–550° C.

* * * * *